Oct. 26, 1971    A. H. RODGERS    3,614,794
PORTABLE SLEEPER UNIT
Filed April 18, 1969    2 Sheets-Sheet 1
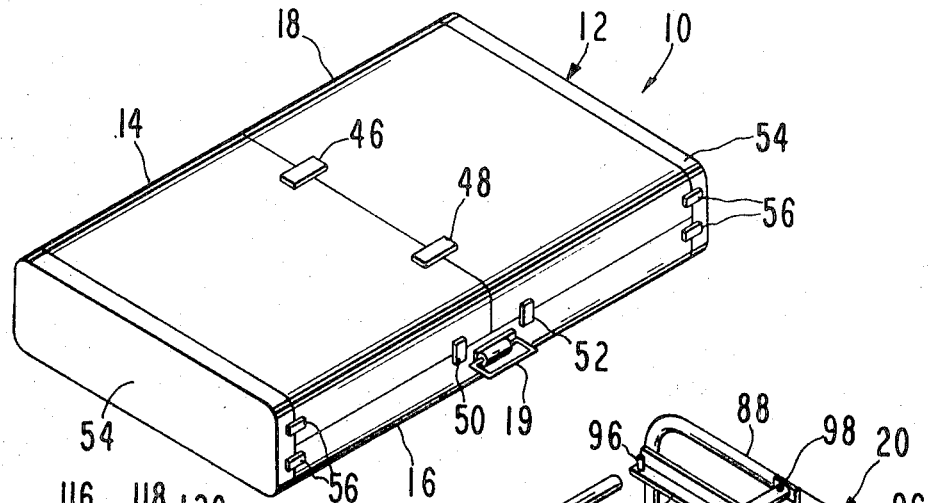
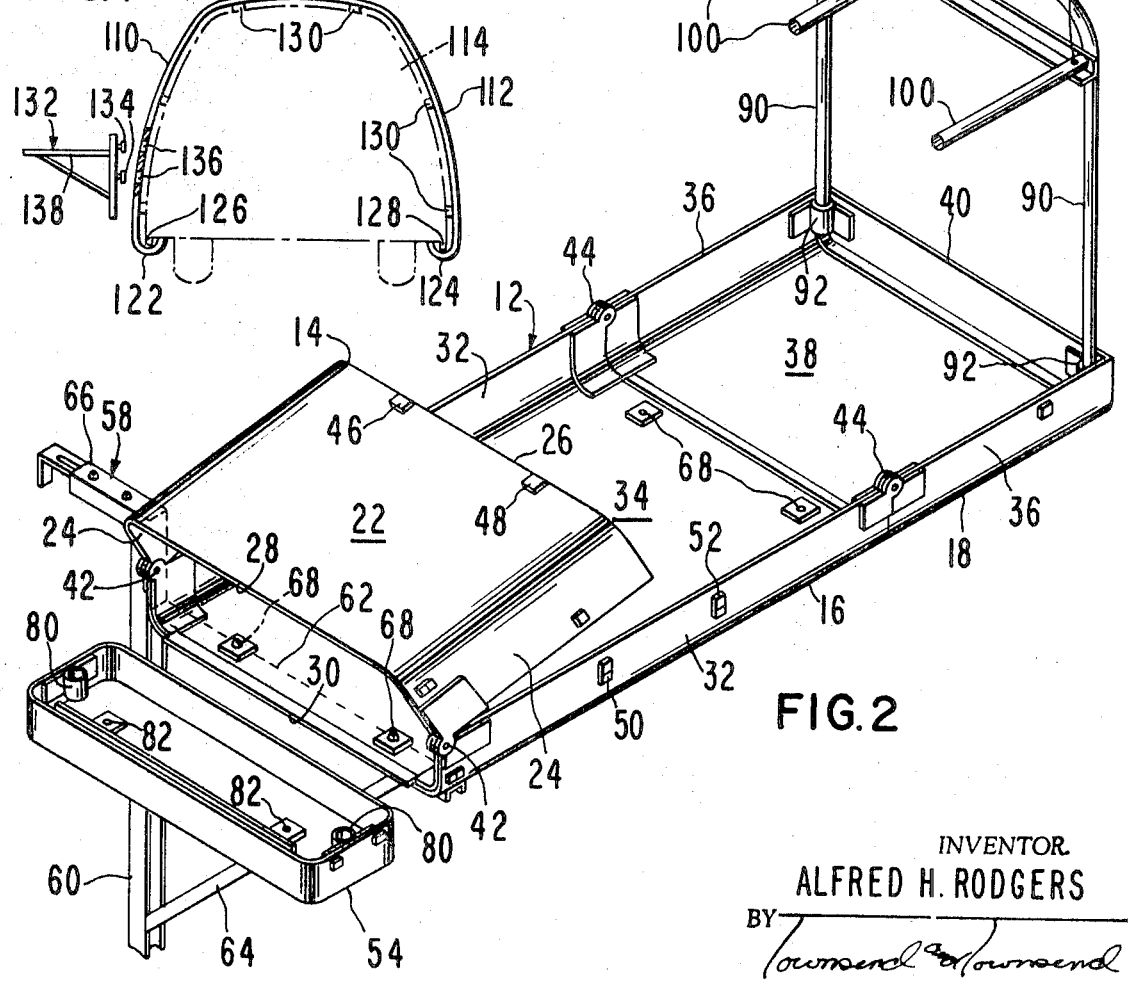
INVENTOR.
ALFRED H. RODGERS
BY
Townsend Townsend
ATTORNEYS

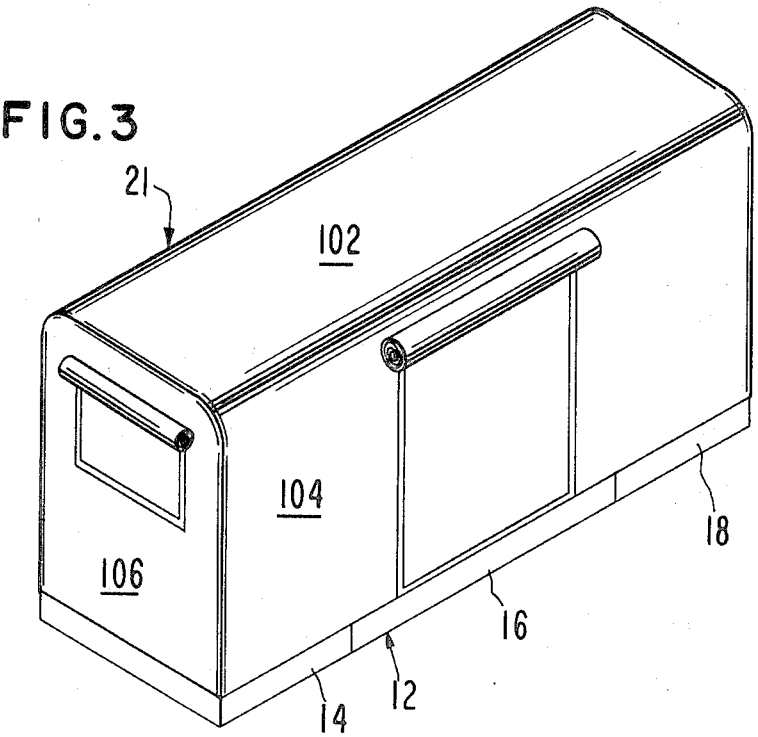
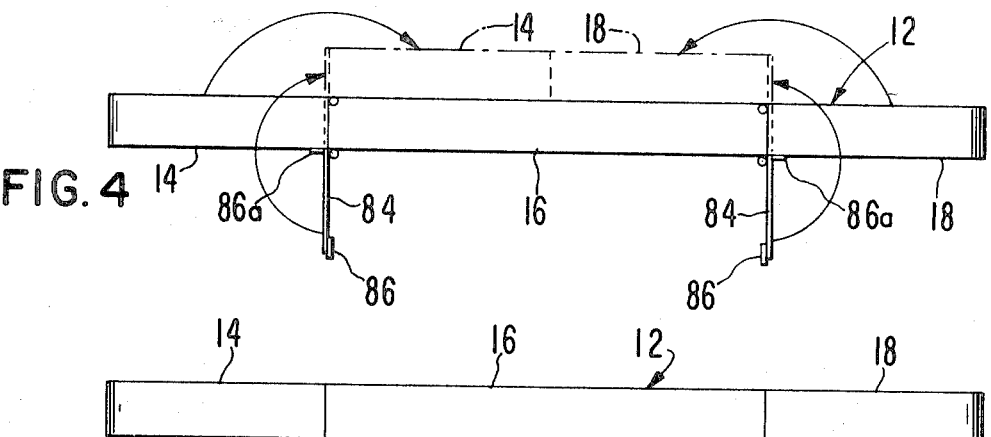
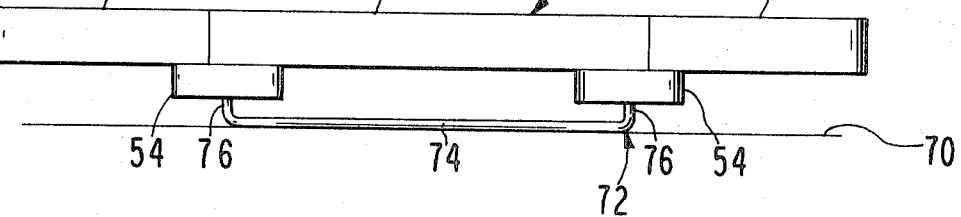
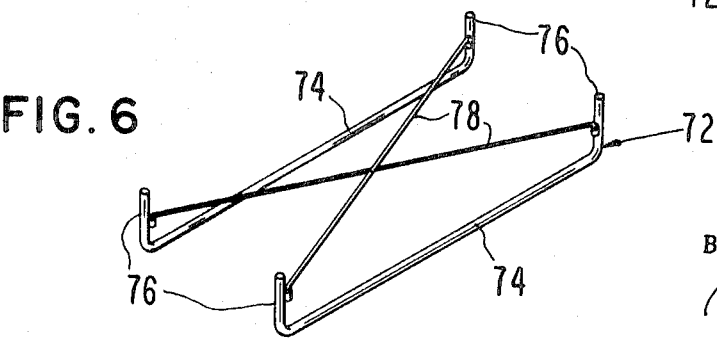
INVENTOR.
ALFRED H. RODGERS
BY
Townsend and Townsend
ATTORNEYS United States Patent Office 3,614,794
Patented Oct. 26, 1971

3,614,794
PORTABLE SLEEPER UNIT
Alfred H. Rodgers, 1051 E. Homestead Road,
Sunnyvale, Calif. 94087
Filed Apr. 18, 1969, Ser. No. 817,318
Int. Cl. A47k 11/02
U.S. Cl. 5—119
12 Claims

ABSTRACT OF THE DISCLOSURE

A portable sleeper unit adapted for use by campers and others wherein the unit is comprised of a collapsible body permitting the unit to be expanded to form a bed-like support and to be collapsed to form a suitcase-like container. The unit can be coupled with brackets for mounting the same on the side of a vehicle or other support or can be used with support legs for positioning the unit above ground.

---

This invention relates to improvements in camper equipment and, more particularly, to an improved sleeper unit for use by campers and others.

The present invention is directed to a collapsible structure which forms a portable sleeper unit in the nature of a bed-like support when the structure is expanded but which is collapsible into a relatively compact configuration resembling a conventional suitcase. In the collapsed condition, the sleeper unit can be readily carried and stored and can contain articles such as camping equipment or cover structure for covering a limited amount of space directly above the bed-like support.

The sleeper unit in its expanded condition can be mounted in several ways above ground level or a support surface. One way of achieving this is to utilize spaced brackets capable of being removably attached to the side of a vehicle or other fixed support and to releasably secure the sleeper unit to the brackets whereby the user is maintained above ground level by virtue of the bracket attachment to the side of a vehicle or fixed support. Broadly, this way of mounting a sleeper unit has been previously set forth in my copending patent application Ser. No. 695,517, entitled Portable Camper and filed Jan. 3, 1968. In the pending application, the brackets are described as being provided with a hook-like extension which operates to hook over the side of a vehicle such as a panel truck or the door or doors of an automobile. A bed-like support is attached to the brackets and secured thereto in any suitable manner.

The present invention provides an improvement over the bed-like support in the pending application by utilizing a different means of collapsing the bed-like support so it assumes a more compact configuration and one that is more readily handled and stored than the bed-like support of the pending application. Since the sleeper unit of this invention takes the shape of a suitcase, it can be easily carried about or stored and can contain camping or other equipment in an out-of-the-way place.

The sleeper unit of this invention can be made of relatively rigid, lightweight materials of high strength characteristics, such as aluminum or the like. It can be made so that only one person is needed to set it up for use, including the mounting of support braces on the bed-like support of the camper unit and the placing of a tarpaulin cover over the braces to enclose a limited space above the sleeper unit. The size of the sleeper unit is such that several such sleeper units can be mounted on one vehicle. The tarpaulin cover can be provided with openings to permit communication or access with the interior of the vehicle on which the sleeper unit is mounted when the cover is in place.

Another feature of the sleeper unit is its relatively simple construction whereby it can be quickly set up and taken down. Thus, the sleeper unit can be used even on a spur-of-the-moment basis by campers and others and requires no special skills or tools or set it up and take it down.

The primary object of this invention is to provide an improved sleeper unit which is expandable into a bed-like support capable of being covered by tarpaulin structure and also capable of being collapsed into a relatively lightweight, compact configuration similar to that of a suitcase to facilitate handling and storage thereof.

Another object of this invention is to provide a portable sleeper unit of the type described wherein the unit is formed from a plurality of hingedly interconnected sections movable from positions in end-to-end relationship to positions in side-by-side relationship so that the support, when it is collapsed, can form a container-like unit capable of being easily carried and stored and of providing a storage space for storing camping or other equipment until ready for use.

A further object of this invention is to provide a collapsible sleeper unit of the aforesaid character which can be set up and taken down by a single person in a minimum of time, without any special skills, and without the use of any tools.

Another object of this invention is to provide a portable sleeper unit comprised of a number of hingedly interconnected sections capable of forming a bed-like support and having mounting means on at least one of the sections for mounting the bed-like support above ground level to permit a user to be safely maintained above ground level when being supported on the sleeper unit.

Other objects of this invention will become apparent as the following specification progresses, reference being had to the accompanying drawings for an illustration of several embodiments of the invention.

FIG. 1 is a perspective view of the portable sleeper in its collapsed condition;

FIG. 2 is a perspective view of the invention partially in an expanded condition and showing the way in which cover structure is coupled to one of the sections of the portable sleeper;

FIG. 3 shows a perspective view of the invention having an enclosure such as a tarpaulin above the sleeper;

FIG. 4 is a side elevational view of a second embodiment of the invention;

FIG. 5 is a side elevational view of the first embodiment of the invention showing support structure for positioning the sleeper on the ground;

FIG. 6 is a perspective view of the support structure of FIG. 5; and

FIG. 7 is an end elevational view of another form of structure for mounting the sleeper on the side of a vehicle.

The present invention is broadly denoted by the numeral 10 and includes a collapsible body 12 formed from a number of hingedly interconnected, relatively rigid sections 14, 16 and 18. Body 12 is collapsible into the configuration of a suitcase shown in FIG. 1 and suitable handle structure 20 is coupled to one side of section 16 to permit the body to be carried in the same manner as carrying a suitcase. The body can be made of lightweight material so that one person can carry it when it is collapsed.

While the invention is suitable for a number of different applications, it is especially adapted for use as a portable sleeper unit and will be described as such a structure hereinafter. To this end, body 12, when it is expanded, forms a relatively flat surface of a size sufficient to permit a person to recline and thereby be supported by the body for sleeping.

While the number of sections of body 12 can be selected as desired, it is preferred that the sections be three in number with the central section 16 being twice the length of each of sections 14 and 18. Thus, the shorter two sections can mate with the central section in the manner shown in FIG. 1 to permit body 12 to be in a collapsed condition and also to enclose the space between the sections. Thus, the enclosed space can be used to carry different articles, such as camping equipment or the like. Also, this space can be used to carry brace structure 20 and tarpaulin structure 21 used to enclose the space above body 12 when the latter is expanded.

Section 14 includes a central portion 22 and a pair of opposed sides 24 rigid to and extending outwardly from portion 22. Section 14 has an end wall (not shown) rigid to central portion 22 adjacent one end edge 26 thereof and spanning the distance between sides 24. The opposite end edge 28 of section 14 is used to abut the corresponding end edge 30 of section 16 when the sections are in their expanded positions.

Sections 16 and 18 have essentially the same configuration as section 14 except that section 16 is open at both ends and is twice as long as each of sections 14 and 18. Section 16 has a pair of opposed sides 32 and a central portion 34. Section 18 has a pair of opposed sides 36, a central portion 38 and an end wall 40. When body 12 is expanded, sides 24, 32 and 36 are in alignment, the inner surfaces of central portions 22, 34 and 38 are substantially coplanar with each other, and the outer end edges of section 16 are in abutting relationship to the adjacent end edges of sections 14 and 18.

A pair of hinges 42 interconnect respective sides 24 and 32 of sections 14 and 16. The hinge line of hinges 42 is adjacent to the outermost edges of the sides of the sections to permit the longitudinal edges of sections 14 and 16 be in abutting relationship with the outer longitudinal edges of sides 32 when the body is collapsed as shown in FIG. 2. The way in which the end and side edges of the sections abut each other permits greater support for the sections when the body is expanded or collapsed. A pair of hinges 44 interconnect sections 16 and 18 in the same manner as hinges 42 connect sections 14 and 16.

When the sections are in their collapsed positions as shown in FIG. 1, they are releasably connected together and suitable fasteners 46, 48, 50 and 52 are provided for this purpose. These fasteners can be conventional hasps or the like. In the collapsed condition of body 12, the ends thereof are open and to close these ends, a pair of closure members 54 are provided, only one of such members being shown in FIG. 2. Each member 54 is tray-like in construction and is coupled by a pair of fasteners 56 at each end of the member to body 12 as shown in FIG. 1. Thus, the space within the body is closed to permit various types of articles to be carried therewithin.

One way of positioning body 12 above ground for sleeping purposes is with the use of a bracket 58 having a vertical member 60, a horizontal member 62 and a brace 64. Vertical member 60 has an adjustable hook-like extension 66 thereon which can be hooked over the side of a vehicle or other suitable support to render member 62 substantially horizontal. A pair of brackets 58 are provided for this purpose and the brackets are releasably connected to body 12 in any suitable manner, preferably by a number of bolts (not shown) which pass through holes 68 in the central portion 34 of section 16 and are threaded into horizontal members 62 of both brackets 58.

Another way of mounting the body is to position the same above ground level or a suitable supporting surface 70 by a support 72 having a pair of U-shaped members 74 provided with vertical legs 76. Support 72 is collapsible by virtue of a pair of braces 78 which are pivotally connected to diagonally opposed legs 76. Support 72 is used by inserting legs 76 thereof into tubular extensions 80 located within closure members 54, the latter being inverted as shown in FIG. 5 and coupled by bolt structure or the like (not shown) through holes 82 in members 54 which mate with corresponding openings 68 in section 16.

In FIG. 4, another way of closing the end openings of body 12 is shown wherein a pair of plates 84 are hingedly mounted on section 16 adjacent to the end edges thereof. These plates are suspended from section 16 when body 12 is expanded but swing into positions closing the respective ends of the body when the latter is collapsed. The dashed line portions of FIG. 4 show the locations of sections 14 and 18 when they are collapsed and the arcuate lines indicate the paths of swinging movement of sections 14 and 18 and plates 84. A suitable fastener 86 is provided for each plate 84, respectively, there being another portion 86a of the fastener on the adjacent section 14 or 16.

Brace structure 20 includes a pair of inverted U-shaped members 88, one of which is shown in FIG. 2. Members 88 are releasably coupled to respective sections 14 and 18 so as to be adjacent to the ends of body 12 when the latter is expanded. To this end, each member 88 has a pair of spaced legs 90 which fit into tubular extensions 92 carried at the ends of the corresponding section, whereby member 88 extends upwardly from body 12. A panel member 94 spans the distance between legs 90 near the upper end of member 88 and has a pair of pins 96 near the ends thereof. A third pin 98 is located at the upper extremity of member 88. Pins 96 and 98 are used to releasably couple three rods 100 to members 88, each rod having a bore in each end for receiving a respective pin. The bore can extend completely through the rod or can be of a length less than the diameter of the rod.

With the rods disposed horizontally and with body 12 mounted either on brackets 58 or support 72, tarpaulin structure 21 can be positioned over members 88 and rods 100. Structure 22 can have any configuration but a preferred form is shown in FIG. 3 wherein structure 21 has a top 102, a pair of opposed sides 104 and a pair of opposed ends 106. Sides 104 and ends 106 may be provided with openings which can be closed by sections of the material from which the tarpaulin structure is made. As shown in FIG. 3, the sections are rolled up to open the openings and the roll of material for closing each opening may be disposed at the bottom as well as at the top of the opening as shown. Suitable cord means (not shown) is provided to hold the rolled sections in place. The openings can be provided with a gauze or similar material to provide an air vent or window in lieu of an opening. The material forming structure 21 is canvas or the like which is flexible and relatively lightweight so that one person can handle it and place it on and take it off brace structure 20.

In use, the invention will initially be in the form of a suitcase as shown in FIG. 1. The assembly can then be manually carried by handle 19 and can be stowed in a relatively small space in view of the compact nature of the invention when it is collapsed.

To prepare body 12 for use as a sleeper unit, closure members 54 are removed from the body assuming the embodiments of FIGS. 1 and 2 are used. Fasteners 56 are manipulated to permit separation of closure members 54 and thereby allow sections 14 and 18 to swing into their expanded positions to form the sleeper unit with section 16. Section 16 may then be connected by bolts to brackets 58 if the latter are used or, if the sleeper unit is to be positioned as shown in FIG. 5, closure members 54 are connected to the underside of section 16 and placed on support 72 so that legs 76 of the support are received in extensions 80. There is no need to lock the sections in their expanded positions because the adjacent end edges of the sections abut each other and prevent further swinging movement in one direction.

Brace structure 20 is then put into place wherein legs 90 of members 88 are placed in extensions 92 of sections 14 and 18. Rods 100 then are connected to pins 96 and 98 so that the rods span the distance between and are connected to members 88.

Tarpaulin structure is then placed over the brace means 20 so that the sleeper unit assumes the configuration shown in FIG. 3.

After use, the invention can be put back in its collapsed condition by first removing the tarpaulin, then removing the brace means 20, following which section 16 is separated from its support means, either brackets 58 or support 72. Sections 14 and 18 are then swung relative to sections 16 so that they again assume the positions shown in FIG. 1. Closure members 54 are then put into place and the invention is ready to be carried to another location. Brace means 20 and tarpaulin structure 21 can be stored within body 12 when the latter is collapsed.

If the embodiment shown in FIG. 4 is used, the opening of body 12 is accomplished by manipulating fasteners 86 to allow plates 84 to swing through an arch of 180°, following which sections 14 and 18 can swing through the same arch into the expanded positions of FIG. 4. The positions of holes 68 permit the attachment of section 16 to brackets 58 even though plates 84 are suspended as shown in FIG. 4.

In FIG. 7, another form of mounting means for the sleeper unit is shown. In this embodiment, a pair of straps 110 and 112 are provided to support each end of the sleeper unit, respectively. Thus, there are a pair of straps 110 at spaced locations on one side of a vehicle 114 and a pair of spaced straps 112 on the opposite side of the vehicle. Each strap 110 has a flange 116 adjacent to the top of the vehicle and adjacent to a flange 118 on the corresponding strap 112. Adjustable connector means 120 draws the flanges together after the ends 122 and 124 of straps 110 and 112 have been hooked under the lowermost extremities 126 and 128 of the vehicle at corresponding sides thereof. Thus, the straps are moved toward the vehicle and are tightly held thereon. Bearing blocks 130 carried by the straps engage the vehicle to maintain the straps out of substantial contact therewith.

To mount a sleeper unit on one side of the vehicle, a pair of brackets 132 are provided. These brackets are substantially the same in construction as brackets 58 except that they have rotatable projections 134 which are received within a pair of openings 136 in strap 110. As soon as the projections are received within the openings, they are rotated so as to engage the inner surface of the strap and thereby hold the corresponding bracket thereon. The sleeper unit can then be bolted or otherwise releasably fastened to the horizontal member 138 of the bracket. The other strap 110 will also have a bracket 132 releasably connected to it in the manner shown in FIG. 7. Moreover, additional brackets can be connected to straps 112 on the opposite side of the vehicle to couple another sleeper unit thereto.

Straps 110 and 112 can be of any suitable material such as flexible steel straps. The flexibility of the straps will allow them to be stored in some suitable manner when they are not in use.

I claim:

1. A collapsible support comprising: a body having a plurality of hingedly interconnected sections, said sections being movable relative to each other from first operative positions thereof with the sections being in end-to-end relationship to second operative positions with at least a pair of the sections being adjacent to and extending longitudinally of a third section, said body having a pair of open ends when the sections are in said second positions; means engageable with at least certain of the sections for releasably blocking said open ends of the body; and means coupled with the sections to releasably hold the same in the second operative positions thereof.

2. A portable sleeper unit comprising: a plurality of relatively rigid sections, each section having a central portion and a pair of opposed sides secured to and extending outwardly from the central portion; means hingedly interconnecting the side of each pair of adjacent sections to permit the sections to move from first operative positions with the central portions thereof disposed in substantially end-to-end relationship to second operative positions with the sides of a pair of sections adjacent to, in substantial abutment with, and extending longitudinally of respective sides of a third section, whereby the sections are collapsed relative to each other; and fastener means coupled with the sections for releasably holding the sections in their collapsed conditions, each of said pair of sections having an open end and said third section having a pair of open ends; means engageable with said sections for releasably closing said open ends thereof when the sections are in said second positions.

3. A portable sleeper unit comprising: a plurality of relatively rigid sections, each section having a central portion and a pair of opposed sides secured to and extending outwardly from the central portion; means hingedly interconnecting the sides of each pair of adjacent sections to permit the sections to move relative to each other from first operative positions with the central portions thereof disposed in substantially end-to-end relationship to second operative positions with the sides of a pair of sections adjacent to, in substantial abutment with, and extending longitudinally of respective sides of a third section, whereby the sections are collapsed relative to each other; means for substantially enclosing a limited space above the sections when the latter are in their first operative positions; and fastener means coupled with the sections for releasably holding the sections in their collapsed conditions.

4. A sleeper unit as set forth in claim 3, wherein said enclosing means includes a number of braces, means on at least one of the sections for mounting the braces thereon, and tarpaulin means carried by the braces for substantially covering said space.

5. A sleeper unit as set forth in claim 2, wherein each open end of the third section is substantially coextensive with the open end of a respective one of said pair of sections, said closing means including a closure for each end of the third section, respectively, each closure being of a size to simultaneously close the respective open end of the third section and the open end coextensive therewith.

6. A portable sleeper unit comprising: a plurality of relatively rigid sections, there being hinge means interconnecting the sections to permit the same to move from first operative positions with the sections disposed in end-to-end relationship to second operative positions with at least a pair of the sections adjacent to and on one side of a third section; means releasably coupling the sections together when the latter are in said second operative positions thereof; and means coupled with at least a first of said sections for mounting the same above ground level when the sections are in their first operative positions.

7. A portable sleeper unit as set forth in claim 6, wherein said mounting means includes a pair of brackets adapted to be coupled to the side of a fixed support, and means carried by the brackets for releasably coupling the latter to said third section.

8. A portable sleeper unit as set forth in claim 6, wherein said mounting means includes a support adapted to be positioned on a supporting surface and having a number of upright legs, and means carried by said third section for receiving the legs to position the sections above said supporting surface.

9. A portable sleeper unit as set forth in claim 6, wherein said mounting means includes strap means for releasable attachment to a vehicle at spaced locations thereon, a bracket for each of said locations respectively, and means releasably coupling each bracket to said strap means for supporting one end of said first section.

10. A portable sleeper unit comprising: a body having a central section and a pair of end sections, each section having a central portion and a pair of opposed side portions secured to and extending laterally from the central portion; hinge structure coupled with the side portions of said sections for mounting the same for movement relative to each other with said hinge structure disposed to permit the sections to move from expanded locations with the sections in end-to-end, substantially abutting relationship to collapsed locations with the end sections adjacent to and extending longitudinally of said central section at one side thereof to present a pair of end openings; means coupled with the sections for releasably attaching the same when the latter are in their collapsed locations; a closure for each end opening, respectively; and means coupled with the closures for releasably attaching the same to the sections.

11. A portable sleeper unit as set forth in claim 10, wherein each closure includes an end plate hingedly connected to an end edge of an adjacent section.

12. A portable sleeper unit as set forth in claim 10, wherein each closure includes a closure member separable from the sections.

References Cited
UNITED STATES PATENTS

| | | | |
|---|---|---|---|
| 526,866 | 10/1894 | Looney | 5—119 |
| 2,743,979 | 5/1956 | Shore | 108—35 X |
| 2,862,777 | 10/1958 | Paige | 108—34 |
| 3,489,453 | 1/1970 | Rodgers | 5—118 X |

J. C. MITCHELL, Primary Examiner

U.S. Cl. X.R.

108—34